Sept. 2, 1969 R. D. THOMPSON 3,464,084
FLASH TRIMMING OF BLOW MOLDED ARTICLES
Filed March 7, 1966 4 Sheets-Sheet 1
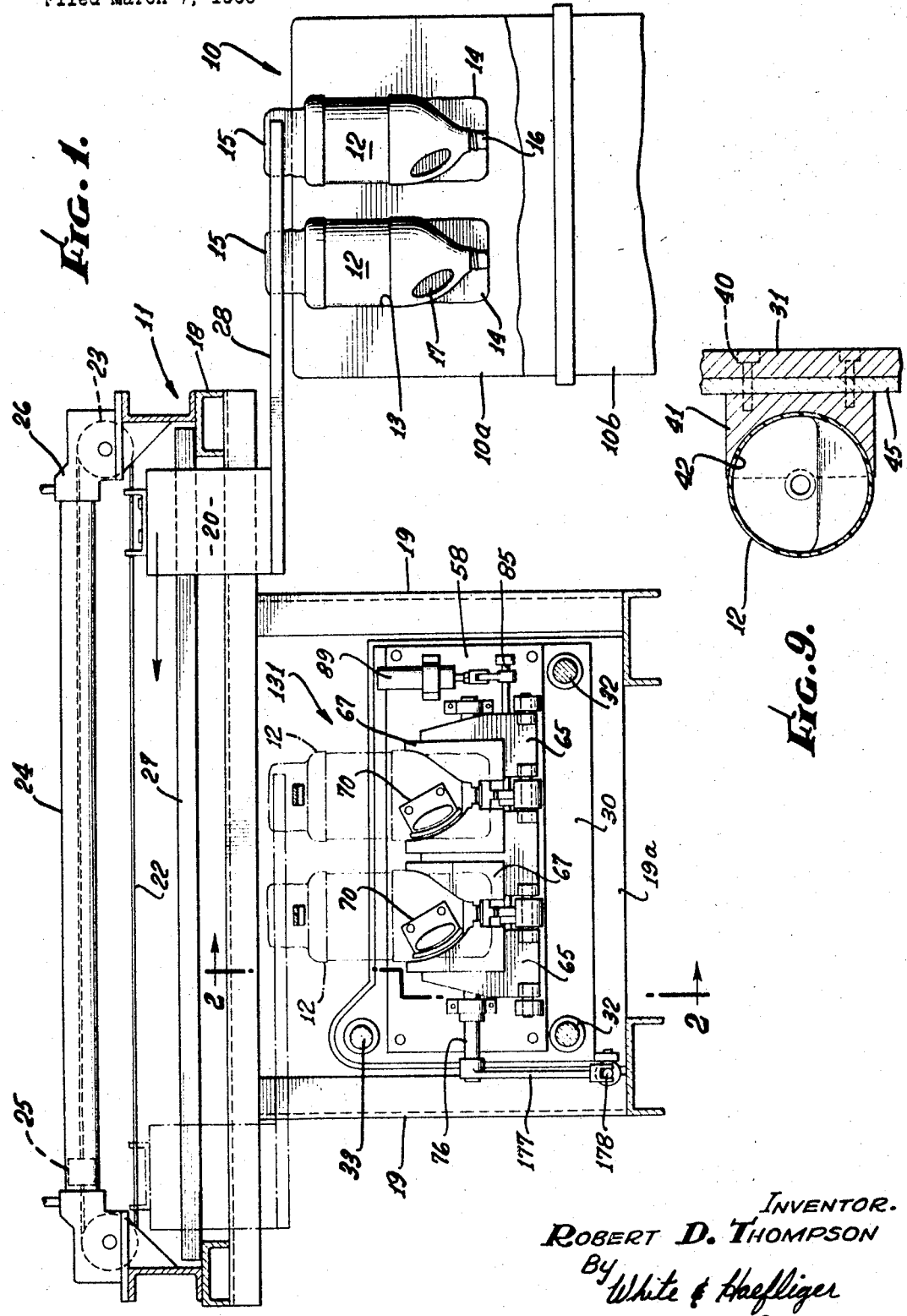
INVENTOR.
ROBERT D. THOMPSON
By White & Haefliger
ATTORNEYS.

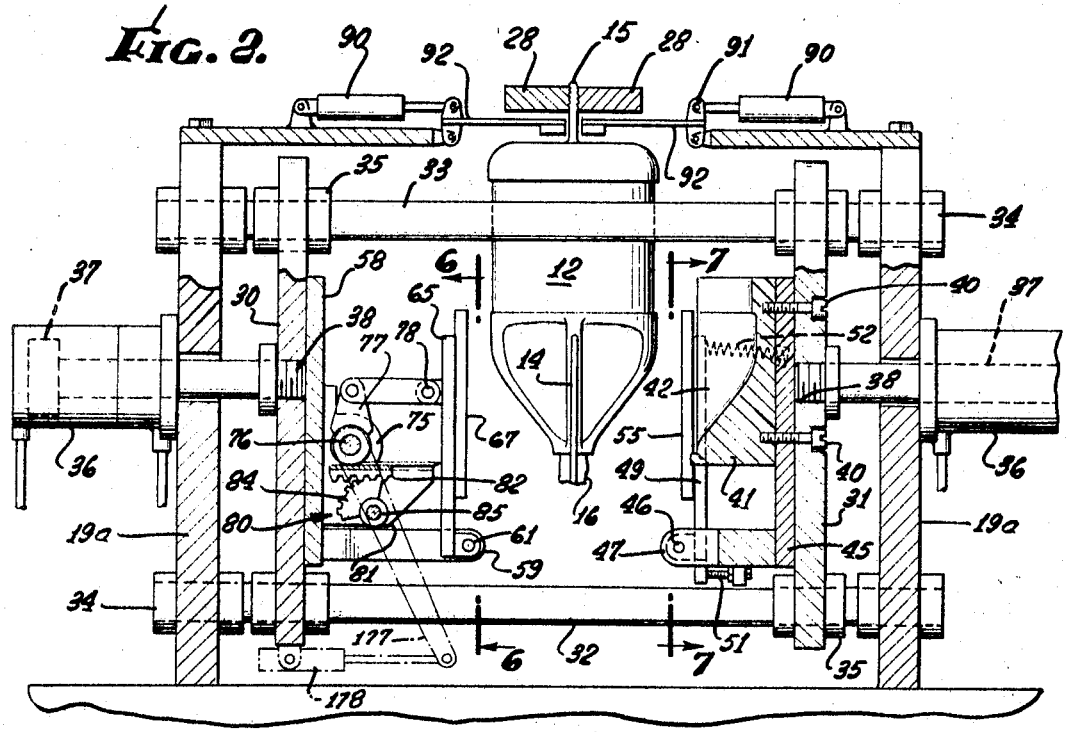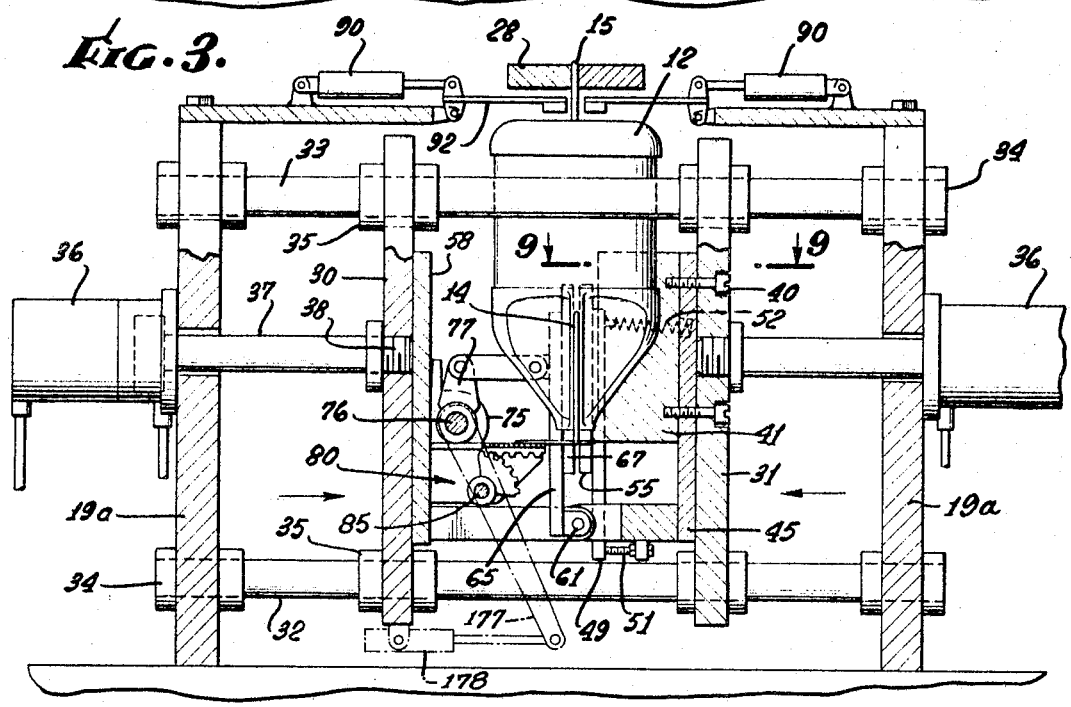

INVENTOR.
ROBERT D. THOMPSON
BY White & Haefliger
ATTORNEYS.

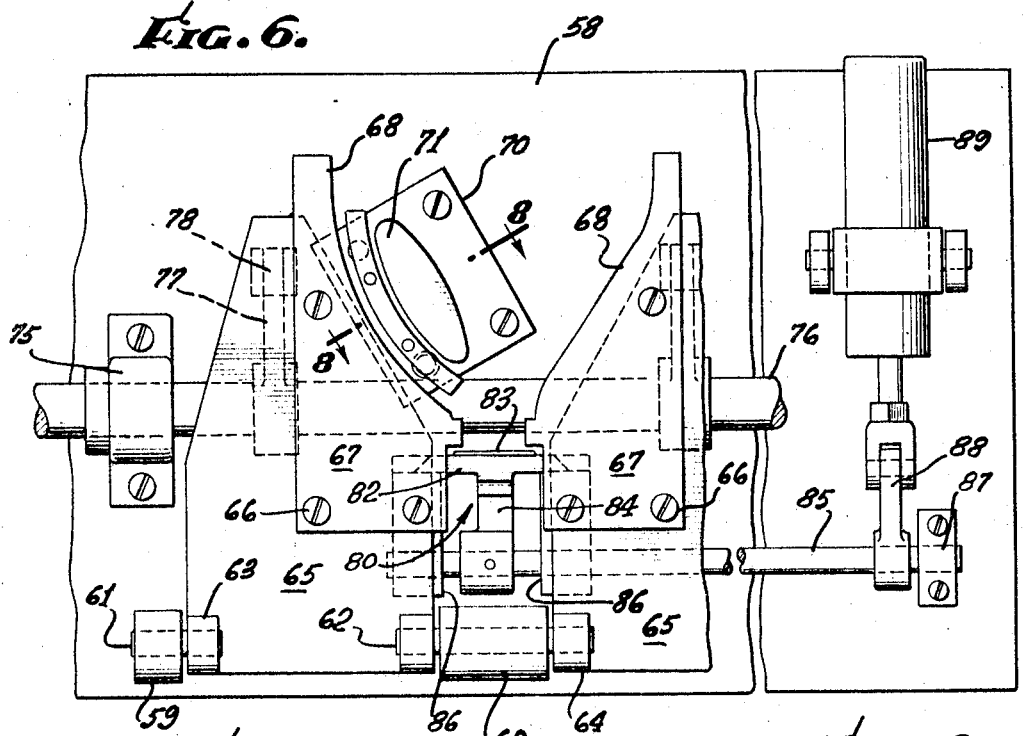
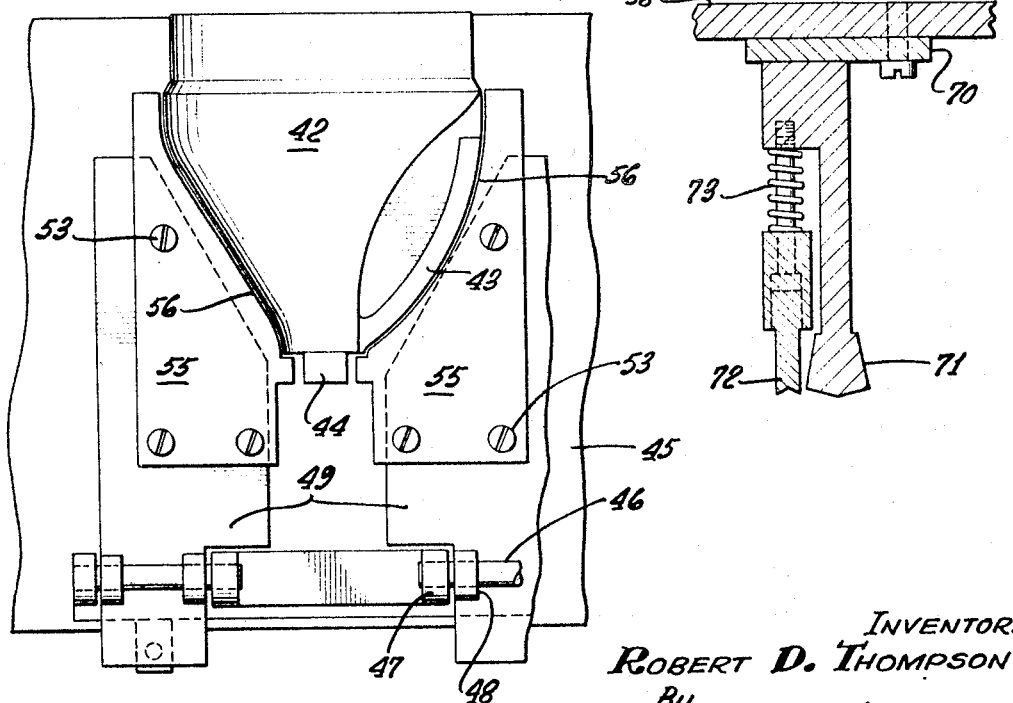

United States Patent Office 3,464,084
Patented Sept. 2, 1969

3,464,084
FLASH TRIMMING OF BLOW MOLDED
ARTICLES
Robert D. Thompson, Anaheim, Calif., assignor to
Purex Corporation, Ltd., Lakewood, Calif., a corporation of California
Filed Mar. 7, 1966, Ser. No. 532,228
Int. Cl. B29c 29/00; B26d 5/00
U.S. Cl. 18—5                                           16 Claims

ABSTRACT OF THE DISCLOSURE

Severance of flash from blow molded containers is realized in a new and efficient manner through grasping the container by its flash while heated and flexible and moving the same to a flash removal station and there severing the flash.

This invention has to do generally with the removal of so-called flash from blow molded plastic containers, and is directed particularly to improved mechanisms which may be used to receive and remove the flash directly following blow molding of the containers and in essentially continuous operative sequence.

In accordance with conventional practices, plastic bottle or jug-like containers are blow molded in operations involving generally the sequence of extruding a tubular plastic, e.g. polyethylene, parison, placing the parison within and between separable sections of a cavitated mold which closes upon the parison in a manner productive of pinched edge or peripheral flash, and removing the container from the mold for subsequent separation of the flash to give the container finished surfaces. The container may be blown with over-extension of its neck portion, which also requires severance to finish the container for labeling and filling.

The molding operation involves blowing a parison sufficiently heated that as blown, and at the time of removal from the mold, the container remains heated so that for a period it has a considerable degree of flexibility to be taken into account for purposes of flash trimming before the container has set to a degree of hardness that the container could be self-supporting against forces applied for flash removal. Although not necessarily so limited in its broader aspects, the invention particularly contemplates trimming means operable upon containers retaining their heated flexibility for complete flash as well as neck severance.

Containers to be de-flashed may be of symmetrical bottle configuration, or particularly in larger sizes in the category of jugs, they may be blow molded with handles with resultant flash both inside and outside the handles as well as at the opposed neck sides and bottoms of the containers. The invention provides for the severance of all such flash as well as neck cut-off, in efficient rapid sequence matching the blow molding speed, thus to obviate any necessity for molded container accumulations for purposes of de-flashing.

In accordance with the invention, the de-flashing sequence starts with grasping a portion of flash projecting from the mold assembly, transferring the container to a de-flashing station, and there acting upon the container by mechanisms which will remove the flash and desirably also sever the container neck in the same operative sequence. Particular provisions are made to support the container in its residually heated and flexible state so as to enable the flash to be trimmed off without reliance upon support afforded by the container.

Thus the invention has for one of its more particular objects to provide at the de-flashing station cavitated support for the container, and means operable in conjunction therewith to sever the flash, such means being adaptable to the flash locations in different situations as where the containers may or may not have handles. The invention is also equipped for container neck severance while the container is retained in its cavitated support.

The invention has various additional features and objects, all of which will be most readily understood without necessity for further preliminary discussion, from the following detailed description of the accompanying drawings illustrative of a typical embodiment of the invention, and in which:

FIG. 1 is a general view showing in side elevation the flash trimming mechanisms in conjunction with a diagrammatically and sectionally shown blow molding unit;

FIG. 2 is an enlarged cross section on line 2—2 of FIG. 1;

FIGS. 3, 4 and 5 are views similar to FIG. 2 showing the parts in changed positions assumed during the operative sequence;

FIG. 6 is a fragmentary section taken on line 6—6 of FIG. 2;

FIG. 7 is a fragmentary section on line 7—7 of FIG. 2;

FIG. 8 is a fragmentary cross section taken on line 8—8 of FIG. 6; and

FIG. 9 is a fragmentary section taken on line 9—9 of FIG. 3.

Figure 4:
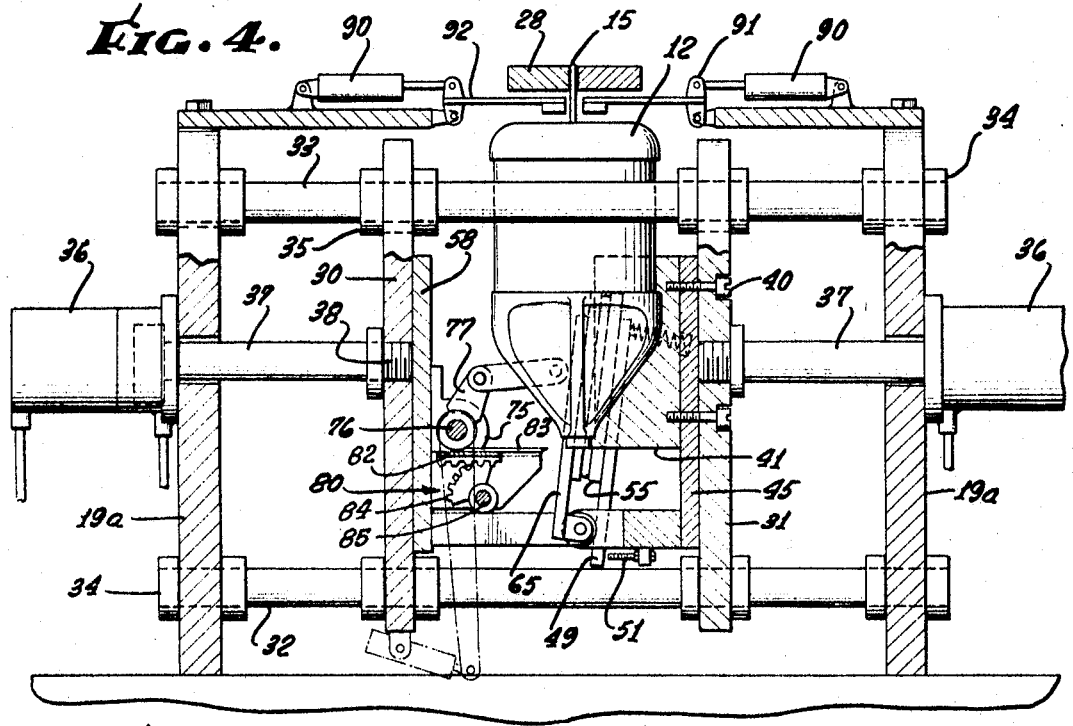

The system illustrated in FIG. 1 may be described generally as comprising a conventional multi-section blow molding unit 10, mechanism 11 operable to transfer one or more blown plastic containers 12 to a flash trimming station 131 at which the container or containers are de-flashed and trimmed as later described.

The unit at 10 is intended to typify any of various known kinds of blow molding equipment comprising separable sections 10a and 10b between which one or plural heated plastic parisons are introduced to be blown in conventional manners to form one or plural containers 12, as the case may be, within the mold cavities 13. As is known to those familiar with the art, the mold sections in closing upon each parison flattens or pinches together the parison plastic beyond the cavity configuration, thus to result in residual flash 14 as at opposite sides of the container neck portion 12, forming also container bottom flash 15, and also a terminal non-functional extension 16 of the neck. Where the container has a handled jug configuration, flattened flash is also formed at 17 in conformance with the handle opening. The invention may be employed preferably, though typically, in conjunction with a blow molding unit wherein the container is formed in inverted position, with the flash 15 projecting up through and between the mold sections.

Upon blowing of the parison to the mold cavity configuration, the mold sections separate, leaving the container with heated flexibility and in condition for transference by the mechanism 11, which may be used for the transfer of one or plural blown containers depending upon whether the unit 10 is operated to produce single or plural containers.

For purposes of the transfer means 11, I may employ a mechanism more particularly dealt with and described in the Cordiale et al. Patent 3,211,815 issued Oct. 12, 1965, on "Molded Bottle Ejection Apparatus and Method." Such mechanism thus being known, it will suffice for present purposes to describe the transfer means 11 generally as comprising a suitable frame structure 18, which also includes base frame 19, and a carrier 20 which is horizontally reciprocable between the solid and broken line positions of FIG. 1, by suitable means typified by cable 22 connected to the carriage and extending continuously about sheaves 23 within a cylinder 24, the cable being attached to a piston 25 which is reversely pressurized to reciprocate the cable and carriage 20. The cable extends through appropriate seals, not shown, in castings 26, and the carrier 20 is suitably guided as against or between rails 27 supported by the frame. The carrier mounts a pair of gripping arms 28 movable together and apart as according to the teachings of the Cordiale et al. patent and by means associated with the carriage, to releasably engage against the container flash 15, thus to grasp the flash when the mold sections have opened and to transfer the containers, suspended by the flash, to the trimming station 131. At the conclusion of the trimming operation the arms 28 are releasable by a control means associated with the carrier 20 to release the flash.

The trimming mechanism 131, accommodated within the frame members 19 and 19a, see FIGS. 2 to 5, comprises a pair of supporting plates 30 and 31 through which extend a pair of lower rods 32 and an upper rod 33, see FIG. 1, the rods being stationarily accommodated within bearings 34 and the plates 30 and 31 carrying bearings 35 which mount the plates for sliding movement together and apart on the rods between the extreme outer and inner positions of FIGS. 2 and 4. The supporting plates are simultaneously reciprocable by suitable means such as fluid pressurized cylinders 36 mounted to the frame 19a and having pistons 37 connected to the plates at 38.

In particular reference to FIGS. 2 and 7, plate 31 mounts by screws 40 a container supporting block 41 cavitated at 42 and at 43 in conformance with the peripheral shape of the bottom head portion of the container, the recess at 43 being definitive of the handle shape. The additional recess 44 is definitive of the neck portion of the container intended to remain after trimming. The depth of recesses 42, 43 and 44 corresponds substantially to half the diametrical dimension of the container and neck and to half the handle thickness. The peripheries of these recesses have edge definition by the block 41, i.e. the block is peripherally contoured and recessed at 43 in sharp edge definition of the container and handle shapes.

Plate 31 also mounts by screws 40 a plate carrying shafts 46 supported between bearings 47 and extending through bearings 48 carried by a pair of plates 49 which are thus mounted for oscillation on the shafts 46 between the positions shown in FIGS. 2 and 4. Plates 49 normally are maintained by adjustable stops 51 in their FIG. 2 positions against the inward urging of springs 52. Plates 49 in turn mount by screws 53 a pair of shear plates 55 having at 56 shearing edges corresponding to the shape of the container and handle peripheries as shown in FIG. 7. It will be observed that the plates 55 normally, i.e. as in FIGS. 2 and 3, project beyond the inner face of the block 41 so as to be engageable against the container flash 14, and that thereafter the plates are displaceable against the resistance of springs 52 to allow clamped engagement of the flash between the plates and the later described plates 67 as in FIG. 3.

Supporting plate 30 mounts a plate 58 carrying inwardly spaced bearings 59 and 60 which support alined shafts or trunions 61 and 62 extending within bearings 63 and 64 carried by a pair of plates 65 thus to mount the latter for oscillatory movement as between FIG. 3 and FIG. 4 positions. Plates 65 mount by screws 66 a pair of shear plates 67 having inner edge configurations at 68 corresponding to the inner edge shapes 56 of previously described plates 55. Plate 58 carries a mount 70 which carries a projecting punch 71 corresponding in shape to the bottle handle opening at 17. Mount 70 also carries an arcuate supporting jaw 72 contoured according to and adapted to engage against the container handle, the jaw being displaceable relative to the punch 71 against the resistance of coil springs 73. Thus the punch 71 is adapted to engage against the flash 17 within the handle while the latter is engaged and supported by the jaw 72.

Plate 58 carries a pair of bearings 75 within which is journaled a shaft 76 to which is keyed an arm 177 actuable to oscillate the shaft between the FIG. 2 and FIG. 4 positions by pistons 178. The shaft 76 carries a pair of arms 77 pivoted at 78 to the plates 65 so that upon reverse rotations of the shaft 76 the plates are caused to oscillate about shafts 61 and 62.

Plate 58 also mounts a cutter device generally indicated at 80, comprising a bracket support 81 within which is accommodated a rack 82 carrying knife 83. Rack 82 is reciprocable to actuate the knife by a pinion segment 84 carried by shaft 85 journaled within bracket bearings 86 and within a terminal bearing 87 see FIG. 6. Shaft 85 carries an arm 88 actuable by piston 89 to oscillate the pinion and reciprocate the cutting blade.

Figure 5:
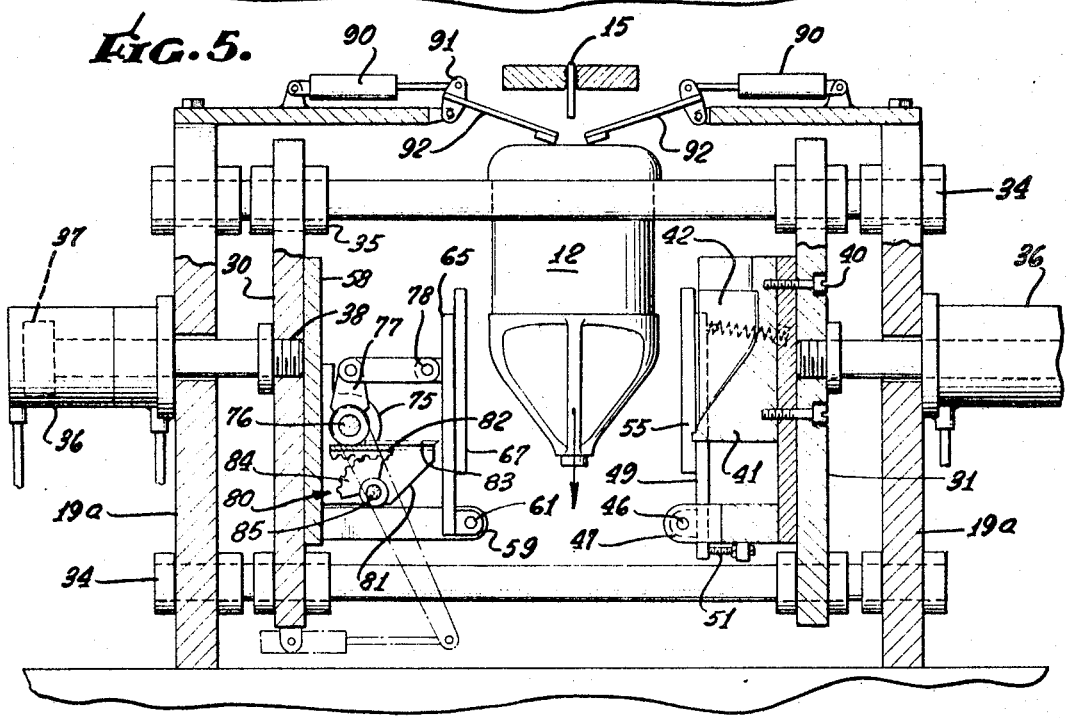

The top of the frame structure mounts a pair of fluid pressurized cylinders 90 whose pistons are operable to oscillate pivoted links 91 carrying arms 92 normally spaced to receive between them the container flash 15. Upon actuation of the piston and cylinder devices, arms 92 are forceable down against the container for flash severance as indicated in FIG. 5.

In considering the operation of the system it will be assumed that all the described piston and cylinder devices are controlled and interrelated in their operative sequences by suitable means, not shown, which are known to and providable by those skilled in the art.

It may be assumed first that the containers 12 are in the FIG. 1 position ready for release from the mold with the flash 15 grasped by the arms 28. Thus held, the containers are shifted to the FIG. 1 broken line positions directly opposite the cavitated supporting blocks 41. Thereupon, actuated by the pistons 37, the plates and assemblages carried thereby are brought to the FIG. 3 position at which shafts 61 and 46 are axially alined, one side of the container head portion being received within the cavity 42 as shown in FIG. 9, and the handle within recess 43, with the flash 14 engaged or clamped between the shear plates 55 and 67. Upon arrival at the FIG. 3 position, the cutter blade 83 will have been advanced through rotation of the pinion 84 by the 89 piston actuation, to sever the unwanted extension 16 of the container neck. Next in sequence, piston 78 is actuated to simultaneously oscillate plates 65 and 49 with their shear plates 67 and 55 to the FIG. 4 position, the effect of the assemblage oscillation being to shear off the container flash 14 at opposite sides of the neck portion. As the parts come together in FIG. 3, punch 71 severs out the handle flash 17. These operations occur while the flexible container remains supported within the cavity 42 and the handle is supported by the jaw 72 and within recess 45. By reverse displacement of the actuating pistons, plates 30 and 31 move outwardly toward restoration to the starting positions of the assemblages.

The flash 15 is retained between arms 28 during the described operations so that the container remains supported and at times suspended from its inverted bottom. Upon separation of the assemblages as to the FIG. 5 position, cylinders 90 are pressurized to displace arms 92 downwardly against the bottom of the container with sufficient force or pressure to sever the flash and permit the trimmed container to drop down for reception by an appropriate conveyor system.

As known to those familiar with the plastic container blow molding art, the conventional equipment diagrammatically indicated at 10 cycles to blow the containers and open the mold cavities for the container removal, at predetermined uniform intervals. The method employed in accordance with the invention makes possible an important production advantage in that it permits trimming of the containers at a rate in keeping with or corresponding to the blow molding rate, thus to maintain a progressive operating sequence which obviates any necessity for container accumulation for purposes of de-flashing. Accordingly, using conventional controls operating in predetermined time sequence, the transfer mechanism 11 is operated to shift the heated containers 12, while flexible because of their heating, to the trimming station 131, where the operative sequences described in reference to FIGS. 2 to 8 are performed upon the containers while they retain their flexibility, an important feature permissive of flash trimming while the containers remain flexible by the lateral support given them as within the cavitated blocks 41. Following ejection of the trimmed containers as in FIG. 5, the transfer mechanism 18 returns to engage the flash 15 of the next containers upon completion of their molding.

I claim:

1. Mechanism for removing flash from a plastic container following blow molding thereof and while the container remains heated and flexible and has bottom diametrical flash and radially projecting neck flash, that includes means for grasping a portion of the container flash and moving the container to a flash removal station, means operable to releasably engage and externally support the side of the container at said station, and means operable to sever flash from the supported container.

2. Mechanism according to claim 1, in which said supporting means is cavitated to receive the container.

3. Mechanism according to claim 1, in which said flash severing means moves relative to the container to sever the flash.

4. Mechanism according to claim 1, including also means operable in conjunction with the flash severing means to cut off a neck portion of the container.

5. Mechanism for removing flash from a container having a handle and flash inside and outside the handle following blow molding thereof and while the container remains heated and flexible and has bottom diametrical flash and radially projecting neck flash, that includes means for grasping a portion of the container flash and moving the container to a flash removal station, means operable to releasably engage and externally support the side of the container at said station, and means operable to sever said inside and outside flash.

6. Mechanism according to claim 1, in which said grasping means grips said bottom flash during movement of the container to said station.

7. Mechanism according to claim 6, in which said flash severing means operates to sever flash from the neck portion of the container and said grasping means engage the container flash during such severance.

8. Mechanism according to claim 6, comprising means operable in conjunction with said flash severing means to cut off a neck portion of the container, and means for severing the bottom flash therefrom.

9. Mechanism for removing flash from a plastic container following blow molding thereof and while the container remains heated and flexible and has bottom diametrical flash and radially projecting neck flash, that includes means for grasping a portion of the container flash and moving the container to a flash removal station, means operable to releasably engage and externally support the side of the container at said station, and means operable to sever flash from the supported container and in which the first mentioned means grasps the bottom flash and suspends the container in inverted position, said supporting means comprising one of a pair of members relatively movable together and apart toward and away from the container between them, said one of the members being cavitated in conformance with the container shape to receive the container.

10. Mechanism according to claim 9, in which the other of said members carries means operable to cut off a neck portion of the container.

11. Mechanism according to claim 9, in which the other of said members carries means engageable with flash inside and outside a handle portion of the container and also with diametrically opposed neck flash.

12. Mechanism according to claim 11, comprising also secondary supporting means movable relative to and operable in conjunction with said cavitated member to engage container neck flash projecting beyond the member cavity, and means operable to clamp said neck flash between said other member and secondary supporting means and for moving them together relative to the container to shear off the flash.

13. Mechanism according to claim 12, comprising also means operable to sever a neck portion of the container, and means operable to sever the bottom flash therefrom.

14. Mechanism according to claim 1, in combination with a blow molding machine having separable cavitated sections from which projects the container flash grasped by the first mentioned means.

15. Mechanism according to claim 14, in which a heated flexible container is transferred to said flash removal station and is supported by said supporting means while the container retains flexibility and flash is removed by said flash removing means.

16. Mechanism according to claim 13, in combination with a machine for blow molding the container in inverted position and having separable cavitated sections upwardly from between which projects container bottom flash grasped by the first mentioned means.

References Cited

UNITED STATES PATENTS

| | | | |
|---|---|---|---|
| 3,040,376 | 6/1962 | Elphee | 225—101 X |
| 3,211,815 | 10/1965 | Cordiale et al. | 264—94 |
| 3,270,116 | 8/1966 | Ruekberg | 18—5 |
| 3,319,498 | 5/1967 | Wolford | 83—914 X |
| 3,351,981 | 11/1967 | Rupert | 83—914 X |

JAMES M. MEISTER, Primary Examiner

U.S. Cl. X.R.

83—418, 914; 225—94, 100